(12) United States Patent
Wang

(10) Patent No.: US 8,284,160 B2
(45) Date of Patent: Oct. 9, 2012

(54) HEAD-MOUNTED COMPUTER MOUSE

(75) Inventor: Ning Wang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 285 days.

(21) Appl. No.: 12/871,933

(22) Filed: Aug. 31, 2010

(65) Prior Publication Data

US 2011/0259928 A1    Oct. 27, 2011

(30) Foreign Application Priority Data

Apr. 23, 2010    (CN) .......................... 2010 1 0154335

(51) Int. Cl.
*G09G 5/08*    (2006.01)
(52) U.S. Cl. ...................................... 345/157; 345/163
(58) Field of Classification Search .......... 345/156–166; 463/37
See application file for complete search history.

(56) References Cited

U.S. PATENT DOCUMENTS

| | | | | |
|---|---|---|---|---|
| 6,084,556 | A | * | 7/2000 | Zwern ................................ 345/8 |
| 6,124,843 | A | * | 9/2000 | Kodama ......................... 715/856 |
| 6,148,669 | A | * | 11/2000 | Roest ........................... 73/514.31 |
| 2006/0012571 | A1 * | | 1/2006 | Rodgers et al. ............... 345/157 |
| 2008/0300885 | A1 * | | 12/2008 | Shih et al. ...................... 704/271 |

\* cited by examiner

*Primary Examiner* — Jimmy H Nguyen
(74) *Attorney, Agent, or Firm* — Altis Law Group, Inc.

(57) ABSTRACT

A head-mounted computer mouse for controlling a cursor on a display of a host device is provided. The head-mounted mouse includes a hollow headpiece, a fixing member, a holding member, and a processing unit. The headpiece includes a support portion mounted therein. The fixing member is configured for mounting the headpiece on a user to prevent the headpiece from moving relative to the head of the user. The holding member includes a holding portion being worn on the head of the user and a sliding portion. The processing unit includes a displacement detecting module for detecting movement of the sliding portion relative to the support portion to determine a coordinate offset value of the sliding portion; and a communicating module for sending the coordinate offset value of the sliding portion to the host device.

10 Claims, 4 Drawing Sheets

HEAD-MOUNTED COMPUTER MOUSE

BACKGROUND

1. Technical Field

The present disclosure relates to computer mice and, particularly, to a head-mounted computer mouse.

2. Description of Related Art

A computer mouse is a common input device and usually can be operated on a support surface, such as a desk. People whose hands are not free or who do not have full control over their hand movements may not be able to operate a conventional computer mouse.

DETAILED DESCRIPTION

The disclosure, including the accompanying, is illustrated by way of example and not by way of limitation. It should be noted that references to "an" or "one" embodiment in this disclosure are not necessarily to the same embodiment, and such references mean at least one.

Figure 1:
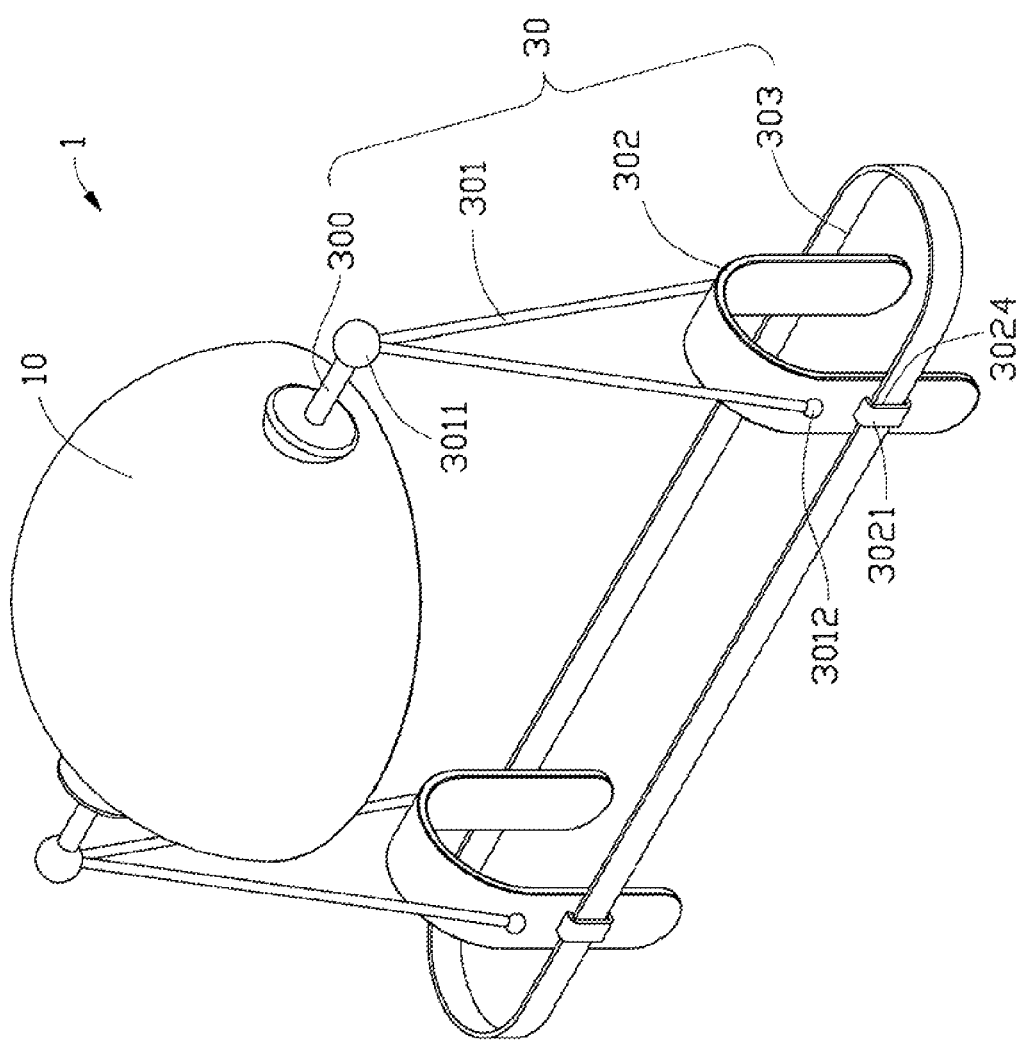
FIG. 1 is an isometric view of a head-mounted computer mouse in accordance with an exemplary embodiment.
Figure 2:
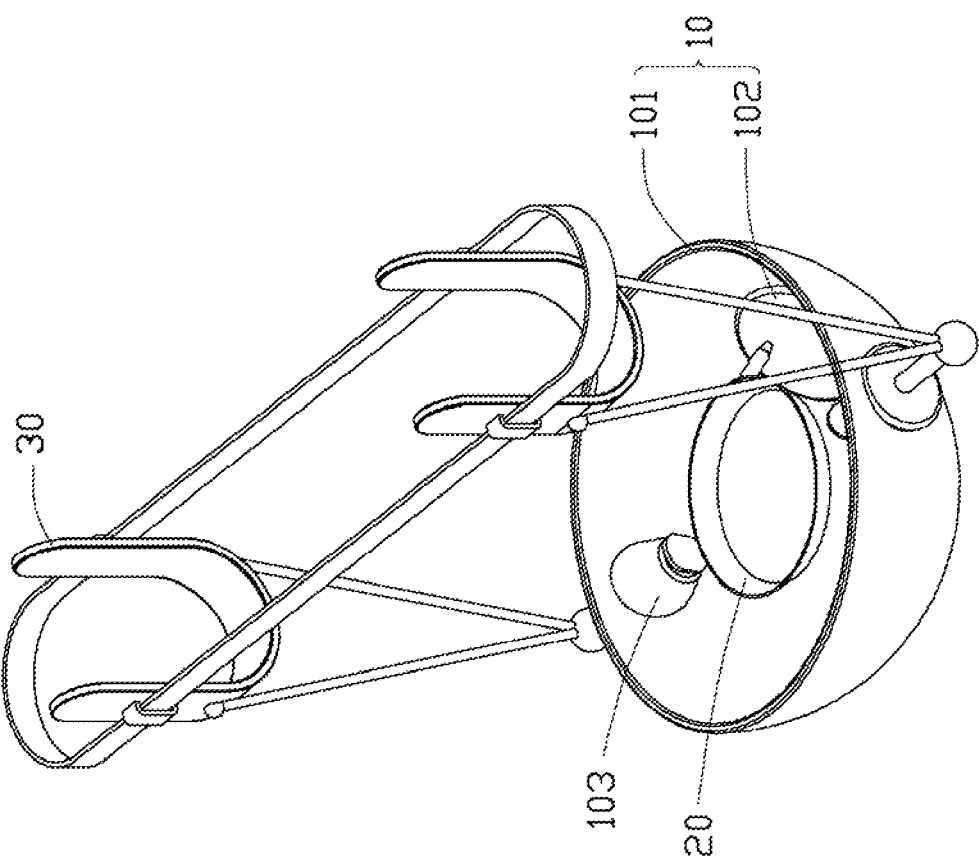
FIG. 2 is another isometric view of the head-mounted computer mouse of FIG. 1, viewed from another aspect.
Figure 3:
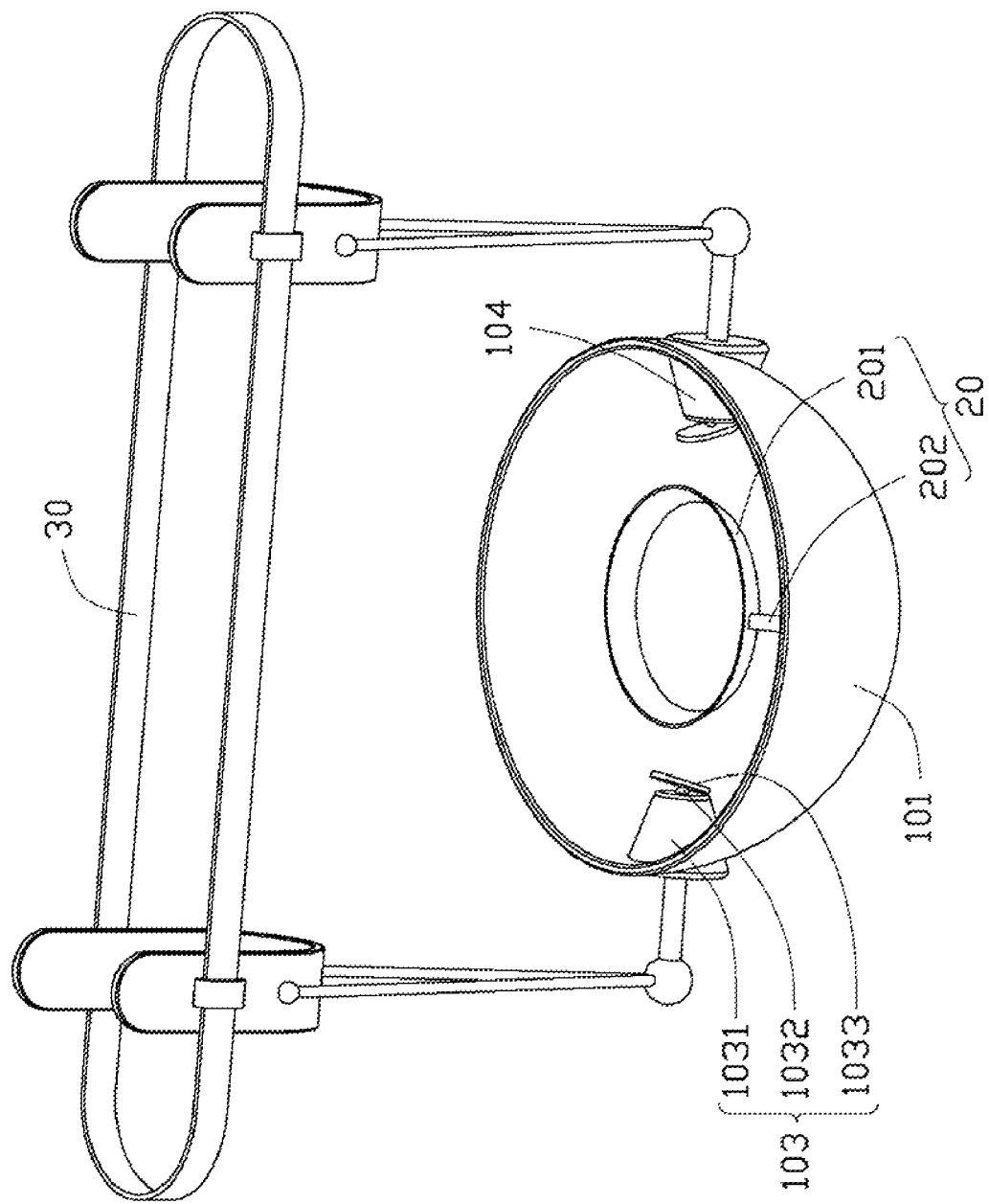
FIG. 3 is another isometric view of the head-mounted computer mouse of FIG. 1, viewed from yet another aspect.

Referring to FIGS. 1-3, a head-mounted computer mouse 1 is illustrated. The head-mounted computer mouse 1 includes a headpiece 10, a holding member 20, and a fixing member 30. The headpiece 10 is a hollow dome, and includes a housing 101, a support portion 102, a first key portion 103 and a second key portion 104. The support portion 102 is a substantially round plate and mounted inside of the housing 101.

Figure 4:
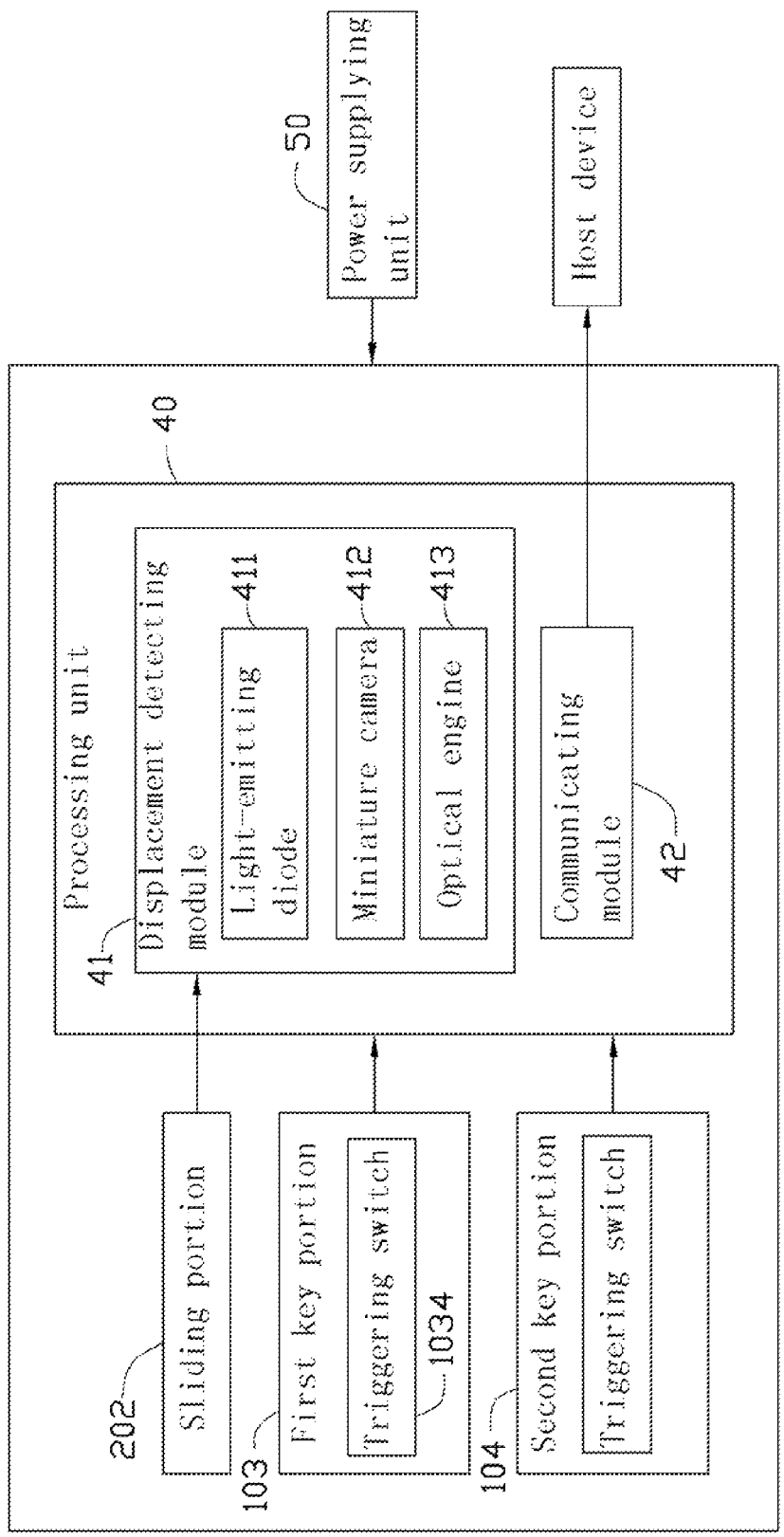
FIG. 4 is a block diagram of a hardware infrastructure of the head-mounted computer mouse of FIG. 1.

The first key portion 103 and the second key portion 104 are mounted inside of the housing 101, and are located at opposite sides of the support portion 102. The first key portion 103 and the second key portion 104 have the same structure. In order to simplify the specification, the disclosure only describes the structure of the first key portion 103. The first key portion 103 includes a base 1031, a triggering element 1032 movably connected to a top surface of the base 1031, and a plate 1033 rotatably connected to the top surface of the base 1031. The base 1031 includes a trigger switch 1034 (as shown in FIG. 4) and other electronic components (not shown) arranged inside thereof. The user's head pushes the plate 1033 to cover the base 1031 and depress the trigger element 1032 into the base 1031, causing the trigger switch 1034 to be activated by the trigger element 1032 and send a signal to a host device, such as a computer (not shown). The computer executes a corresponding operation in response to the signal from the trigger switch 1034. In another embodiment, the plate 1033 can be connected to the base 1031 by an elastic element (not shown), such as a spring. When the plate 1033 presses the trigger element 1032, the elastic element is compressed by the plate 1033. After the external force has ceased, the elastic element rebounds and returns the plate 1033 to an initial position.

The holding member 20 is movably mounted inside of the housing 10, and includes a holding portion 201 and a sliding portion 202 connected to the outside of the holding portion 201. The holding portion 201 is configured to be worn on the head of the user, and is adjustable inside the housing 10. In one embodiment, the holding portion 201 can be a ring. One end of the sliding portion 202 is connected to the holding portion 201, and an opposite end contacts the support portion 102. The sliding portion 202 is capable of sliding together with the holding portion 201 relative to the support portion 102. In one embodiment, the sliding portion 202 can be a substantially round.

The fixing member 30 is fixed to the headpiece 10, and includes two connecting rods 300, two connecting members 301, two opposing seats 302, and a connection portion 303.

The two connecting rods 300 are respectively fixed to the first key portion 103 and the second key portion 104 respectively. Each of the connecting members 301 is substantially V-shaped, and includes a first end 3011, and two second ends 3012 opposing the first end 3011. The first end 3011 is fixed to the one of the two connecting rods 300, and the two second ends 3012 are fixed to one of the two seats 302, thereby fixing each connecting member 301 between one of the two connecting rods 300 and one of the two seats 302. Each seat 302 is substantially U-shaped, and includes two opposing extending portions 3021 extending from opposite sides thereof. Each extending portion 3021 defines a slot 3024 along a horizontal direction. The connection portion 303 passes through the four slots 3024 in turn, thereby connecting the connection portion 303 to the two seats 302. In one embodiment, the connection portion 303 is made of flexible material, such as rubber, and may be flexible.

Referring also to FIG. 4, the head-mounted computer mouse 1 further includes a processing unit 40, and a power supplying unit 50. The power supplying unit 50 is configured for providing power to the head-mounted computer mouse 1. The processing unit 40 includes a displacement detecting module 41 and a communicating module 42. The displacement detecting module 41 is configured for detecting a slide of the sliding portion 202 relative to the support portion 102, to determine a coordinate offset value of the sliding portion 202. In one embodiment, the displacement detecting module 41 includes a light-emitting diode (LED) 411, a miniature camera 412 and an optical engine 413. The LED 411 is configured for illuminating the bottom of the sliding portion 202 when the sliding portion 202 slides relative to the support portion 102. The miniature camera 412 is configured for capturing a sliding track of the sliding portion 202. The optical engine 413 is configured for analyzing the sliding track of the sliding portion 202 to generate a coordinate offset value of the sliding portion 202. In one embodiment, the coordinate offset value includes a distance offset and a direction offset.

The communicating module 42 is configured for transmitting the coordinate offset value of the sliding portion 202 and the signals from the first key portion 103 or the second key portion 104 to a host device. The host device controls a cursor on a display to move according to the coordinate offset value, and executes a corresponding left or right mouse click according to the signals from the first key portion 103 or the second key portion 104.

When in use, the holding portion 201 is worn on the head of the user, the two seats 302 are worn on the shoulders of the user, thereby preventing the headpiece 10 from moving relative to the head of the user. The connection portion 303 passes through the four slots 3024, thereby tightly fixing the headpiece 10 on the head of the user. After the headpiece 10 is fixed on the head of the user, the sliding portion 202 is located in the frontal position of the user's head, and the support potion 102 is located in front of the sliding portion 202, and the first key portion 103 and the second key portion 104 are located at opposite sides of the head of the user.

When attempting to control the cursor to move on a screen, the head of the user lowers (as in a nod) to make the sliding portion 202 contacting the support portion 102, then the head moves to cause the sliding portion 202 to slide relative to the support portion 102. The displacement detecting module 41 detects the slide of the sliding portion 202 relative to the support portion 102 to determine the coordinate offset value of the sliding portion 202. The communicating module 42 sends the coordinate offset value to the host device which controls the cursor to move on the screen according to coordinate offset value. After the cursor moves to a desired position, the user raises their head to make the sliding portion 202 disengage from the support portion 102, thereby keeping the cursor in the desired position. Then, the head moves to press the plate 1033 to make the trigger element 1032 to be received in the base 1031, causing the trigger switch 1034 to be actuated by the trigger element 1032 to send a signal. The communicating module 42 sends the signal to the host device, which controls the cursor to execute a left or right key mouse click according the signal.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A head-mounted computer mouse for controlling a cursor on a display of a host device, comprising:
   a hollow headpiece comprising a support portion mounted therein;
   a fixing member configured for mounting the headpiece on a user to prevent the headpiece from moving relative to the head of the user;
   a holding member mounted within the headpiece, and comprising:
      a holding portion being worn on the head of the user; and
      a sliding portion connected to the holding portion and slidable relative to the support portion; and
   a processing unit comprising:
      a displacement detecting module configured for detecting a movement of the sliding portion relative to the support portion, to determine a coordinate offset value of the sliding portion; and
      a communicating module configured for sending the coordinate offset value of the sliding portion to the host device, wherein the cursor on the display is controlled to move based on the coordinate offset value of the sliding portion.

2. The head-mounted computer mouse as described in claim 1, wherein the headpiece further comprises a first key portion mounted therein, and a second key portion mounted therein and opposing to the first key portion, the first key portion is configured for sending a first signal when being activated, the second key portion is configured for sending a second signal when being activated, the communicating module is further configured for sending the first signal and the second signal to the host device.

3. The head-mounted computer mouse as described in claim 2, wherein the headpiece further comprising a housing, the support portion is mounted within the housing, and the first key portion and the second key portion are mounted within the housing, and are located at opposite sides of the support portion.

4. The head-mounted computer mouse as described in claim 3, wherein the first key portion and the second key portion have the same structure, the first key portion comprises a base, a trigger element, and a plate, the base comprises a trigger switch mounted therein, the trigger element is movably connected to the base, the plate is rotatably connected to a top surface of the base, the plate is operable to be pushed by the head of the user to cover the base and depress the trigger element into the base, causing the trigger switch to be activated by the trigger element and send a first signal.

5. The head-mounted computer mouse as described in claim 3, wherein the fixing member comprises two connecting rods, two connecting members, two opposing seats and a connection portion, the two connecting rods are respectively fixed to the first key portion and the second key portion, each of the two connecting members comprises a first end and two second ends opposite to the first end, the first end is fixed to one of the two connecting rods, and the two second ends are fixed to one of the two seats, thereby fixing each of the two connecting members between one of the two connecting rods and one of the two seats, each of the two seats comprises two opposing extending portions extending from opposite sides thereof, each of the two extending portions defines a slot along a horizontal direction, the connection portion passes through the four slots in turn, thereby connecting the connection portion to the two seats.

6. The head-mounted computer mouse as described in claim 1, wherein the displacement detecting module comprises a light emitting diode (LED), a miniature camera and an optical engine, the LED is configured for illuminating a bottom of the sliding portion, the miniature camera is configured for capturing a sliding track of the sliding portion relative to the support portion, the optical engine is configured for analyzing the sliding track of the sliding portion to generate the coordinate offset value of the sliding portion.

7. The head-mounted computer mouse as described in claim 6, wherein each of the two connecting members is substantially V-shaped.

8. The head-mounted computer mouse as described in claim 6, wherein each of the two seats is substantially U-shaped.

9. The head-mounted computer mouse as described in claim 1, further comprising a power supplying unit configured for providing power to the head-mounted mouse.

10. The head-mounted computer mouse as described in claim 1, wherein the headpiece is a hollow dome.

* * * * *